(12) United States Patent
Foedrowitz

(10) Patent No.: US 8,364,835 B2
(45) Date of Patent: Jan. 29, 2013

(54) COMMUNICATION PROTOCOL, DEVELOPING AND NETWORK OPERATING METHODS THEREFORE

(75) Inventor: Andreas Foedrowitz, Weiterstadt (DE)

(73) Assignee: GVBB Holdings S.A.R.L., Luxembourg (LU)

( * ) Notice: Subject to any disclaimer, the term of this patent is extended or adjusted under 35 U.S.C. 154(b) by 35 days.

(21) Appl. No.: 12/450,747

(22) PCT Filed: Mar. 26, 2008

(86) PCT No.: PCT/EP2008/053547
§ 371 (c)(1),
(2), (4) Date: Oct. 9, 2009

(87) PCT Pub. No.: WO2008/125444
PCT Pub. Date: Oct. 23, 2008

(65) Prior Publication Data
US 2010/0100592 A1    Apr. 22, 2010

(30) Foreign Application Priority Data

Apr. 13, 2007  (EP) ..................................... 07300945

(51) Int. Cl.
*G06F 15/16* (2006.01)
*G06F 15/173* (2006.01)

(52) U.S. Cl. .................... 709/230; 709/223; 709/245

(58) Field of Classification Search .................. 709/204, 709/223, 230, 245
See application file for complete search history.

(56) References Cited

U.S. PATENT DOCUMENTS

| | | | |
|---|---|---|---|
| 4,520,232 A * | 5/1985 | Wilson | 380/28 |
| 5,668,880 A * | 9/1997 | Alajajian | 370/342 |
| 6,598,049 B1 * | 7/2003 | Moriyama | 707/744 |
| 6,959,293 B2 * | 10/2005 | Pirim | 706/20 |
| 2002/0199014 A1 | 12/2002 | Yang et al. | |
| 2004/0072135 A1 * | 4/2004 | Unsicker | 434/322 |
| 2008/0123854 A1 * | 5/2008 | Peel et al. | 380/277 |
| 2009/0259840 A1 * | 10/2009 | Campbell et al. | 713/155 |

FOREIGN PATENT DOCUMENTS

| | | |
|---|---|---|
| EP | 899918 | 3/1999 |
| JP | 11-334444 A | 12/1999 |
| JP | 2004-514366 A5 | 12/2005 |
| JP | 2007-059188 A | 3/2007 |

OTHER PUBLICATIONS

Effnet AB; "An introduction to IP header compression", Feb. 2004, whole document.

(Continued)

*Primary Examiner* — Aaron Strange
(74) *Attorney, Agent, or Firm* — Arent Fox LLP

(57) ABSTRACT

In a method for developing a communication protocol for transmitting binary instructions between devices in a network, each instruction comprising at least one of a binary transmitter identifier, a binary receiver identifier and a binary operation identifier, a set of alphanumeric identifiers for each transmitter of the network is determined, each alphanumeric identifier having the same number of characters. Then a set of binary transmitter identifiers having a same number of bits is generated by converting each alphanumeric identifier of said set into a binary identifier using a compression function. Finally binary instructions are formed having as transmitter identifiers a binary transmitter identifier from said set.

18 Claims, 1 Drawing Sheet

OTHER PUBLICATIONS

Search Report Dated Apr. 8, 2009.
EPO Communication, Application No. 08 718 220.0-2413, dated Nov. 23, 2010.
SIPO First Office Action, Chinese Patent Application No. 200880011882.4.
JPO Notice of Reasons for Rejection, Japanese Patent Application No. 2010-502480, dated Nov. 15, 2011.
Patent Abstracts of Japan, Publication No. 2007-059188, Date of publication of application: Mar. 8, 2007, Application No. 2005-242416, Date of filing: Aug. 24, 2005.
Patent Abstracts of Japan, Publication No. 11-334444, Date of publication of application: Dec. 7, 1999, Application No. 10-164172, Date of filing May 28, 1998.

* cited by examiner

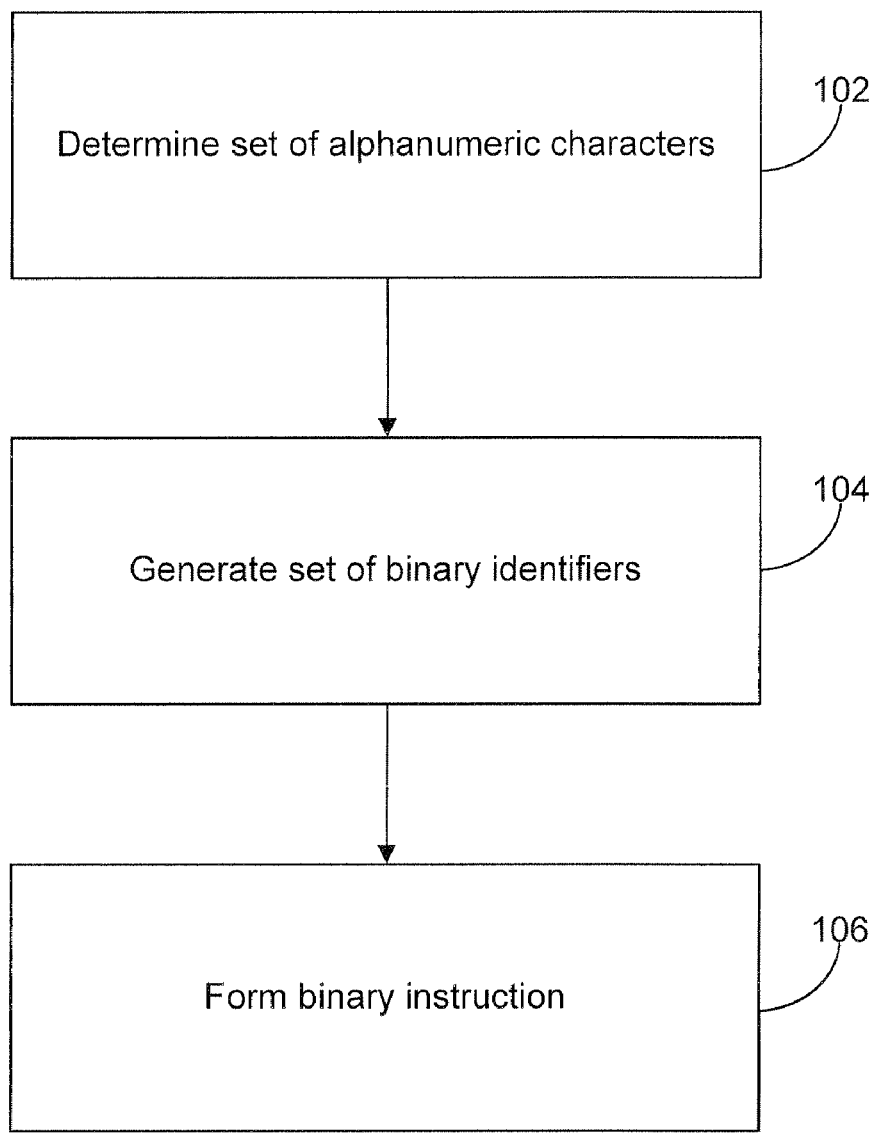

കോMMUNICATION PROTOCOL, DEVELOPING AND NETWORK OPERATING METHODS THEREFORE

This application claims the benefit, under 35 U.S.C. §365 of International Application PCT/EP2008/053547, filed Mar. 26, 2008, which was published in accordance with PCT Article 21(2) on Oct. 23, 2008 in English and which claims the benefit of European patent application No. 07300945.8, filed Apr. 13, 2007.

BACKGROUND OF THE INVENTION

1. Field of the Invention

The present invention relates to a method for developing a communication protocol for transmitting binary instructions between devices in a network, to a method for operating such a network, and to a communication protocol.

2. Background

In a command protocol, source and target objects IDs, i.e. transmitter and receiver identifiers, have to be encoded. This is usually done by assigning magic numbers to the objects, or strings are used as names. Using magic numbers in a machine-optimized value range (e.g. 16 or 32 bits) requires the use of a dictionary to make the encoded IDs human readable, using of plain text strings occupies more space and comparison (e.g. in command parsing) requires much more CPU time.

BRIEF SUMMARY OF THE INVENTION

The object of the present invention is to provide a method for developing a command protocol, a method for operating a network based on a protocol developed according to said former method, and to a command protocol as such, which enable fast processing of the protocol in a transmitter or a receiver while facilitating understanding of the protocol instructions by man without having to use a dictionary.

This object is achieved by a method for developing a communication protocol for transmitting binary instructions between devices in a network, each instruction comprising at least one of a binary transmitter identifier, a binary receiver identifier and a binary operation identifier, comprising the steps of determining a set of alphanumeric identifiers for each instruction and/or each transmitter/receiver of the network, each alphanumeric identifier having the same number of characters, generating a set of binary identifiers having a same number of bits by converting each alphanumeric identifier of said set into a binary identifier using a compression function;

forming binary instructions having as instruction/transmitter/receiver identifiers a binary instruction/transmitter/receiver identifier from said set.

BRIEF DESCRIPTION OF THE DRAWING

FIG. 1 depicts a method for developing a communication protocol, in accordance with various disclosed aspects of the invention.

DETAILED DESCRIPTION

Various concepts will now be presented with respect to a method for developing a communication protocol. The communication protocol enables devices in a network to transmit binary instructions among each other. FIG. 1 depicts an exemplary method 100. As shown at 102, a set of alphanumeric identifiers may be determined. In some aspects of the disclosure, the alphanumeric identifiers may correspond to each of one or more instructions/operations to be exchanged between network devices. In other aspects, the alphanumeric identifiers may correspond to a transmitter and/or receiver in the network. In other aspects, the alphanumeric identifiers may correspond to instructions, transmitters, and receivers. The alphanumeric identifiers may each have the same number of characters. Padding with blanks may be used to ensure that each alphanumeric identifier has the same number of bits.

As depicted at 104, a set of binary identifiers may be generated by converting each alphanumeric identifier into a binary identifier. A compression function may be used to facilitate the generation of the binary identifiers. Since the alphanumeric identifiers all have a same number of characters, they can be compressed into binary identifiers having a same number of bits, and decisions can be made in a receiver based on the value of any of these identifiers by a single processor-level instruction or a small number of processor level instructions (corresponding to e.g. the "switchcase" instruction in the C programming language), whereas if strings (of arbitrary length) have to be compared, a much higher number of processor instructions has to be executed.

For simplicity, the compression function, the bit number and the character number should be the same for each type (instruction/transmitter/receiver) of identifier.

Preferably, each alphanumeric character has an integer numeric value unambiguously assigned to it, and the compression function has the form $$F(A) = ( \ldots ((s[a_0]*c + s[a_1])*c + s[a_2])* \ldots ) + s[a_{n-1}],$$

n being the number of alphanumeric characters in the alphanumeric identifiers, $s[a_i]$, i=0, 1, ..., n−1 being a numerical value assigned to the i-th alphanumeric character $a_i$ of identifier A, c being an integer larger than the largest one of said integer numeric values.

The relation between alphanumeric characters and numerical values may be as indicated in the table below:

| Atom encoding s( ) | | | | | | | | |
|---|---|---|---|---|---|---|---|---|
| enc | 0 | 1 | 2 | 3 | 4 | 5 | 6 | 7 |
| char | NULL | A | B | C | D | E | F | G |
| enc | 8 | 9 | 10 | 11 | 12 | 13 | 14 | 15 |
| char | H | I | J | K | L | M | N | O |
| enc | 16 | 17 | 18 | 19 | 20 | 21 | 22 | 23 |
| char | P | Q | R | S | T | U | V | W |
| enc | 24 | 25 | 26 | 27 | 28 | 29 | 30 | 31 |
| char | X | Y | Z | 0 | 1 | 2 | 3 | 4 |
| enc | 32 | 33 | 34 | 35 | 36 | 37 | 38 | 39 |
| char | 5 | 6 | 7 | 8 | 9 | . | - | * |

In order to keep the number of bits of the binary identifiers small, no lower-case letters are included in the alphanumeric character set (The coding might also be said to be insensitive to case).

As depicted at 106, binary instructions may be formed using the generated binary identifiers. According to a preferred embodiment of the invention, the receivers and transmitters of the network are video/audio signal sources and signal processors such as disk, cassette or tape recording machines and mixers in a TV studio environment.

In such an environment, a typical command might be a playback instruction "PLAY CP1 TAPE1" having assigned to it an alphanumerical identifier "PLAY" from a control panel alphanumerically identified as "CP1" to a tape recorder "TAPE1". All identifiers have 6 characters, unused trailing ones being padded with blanks. The binary identifier A="PLAY" corresponds, according to above function F, to $$F(\text{``PLAY''}) = (((((s(P)*40) + S(L))*40 + s(A))*40 + s(Y))*40 + s())*40 + s()$$
$$= (((((24*40) + 20)*40 + 1)*40 + 33)*40 + 0)*40 + 0$$
$$= \ldots$$

The binary identifiers obtained according to this formula have 32 bits, so that they can be processed in a single instruction by a processor of the receiver having a register width and/or a storage bus width of 32 bits.

At a receiver side, the alphanumeric form of the identifiers can be restored by an iterative modulo operation:
s(0):=F("PLAY")mod 40;
F("PLAY"): F("PLAY")div 40;
S(1):=F("PLAY")mod 40;
F("PLA"):=F("PLAY")div 40;
and so on.

Restoring the alphanumeric form at the receiver side is of particular interest when debugging the network, the receiver in this case not being the device to which the instruction is actually addressed, but a network sniffer. Other instruction identifiers might be e.g. "REWIND", "FF", "RECORD", etc., the meaning of which is self-explaining to the man of the art in the field of video technology.

The invention claimed is:

1. Method for developing a communication protocol for transmitting binary instructions between devices in a network, each instruction comprising a binary operation identifier and at least one of a binary transmitter identifier and a binary receiver identifier, the method comprising:
   determining a set of alphanumeric identifiers for each operation identifier and each transmitter or receiver of the network, respectively, each alphanumeric identifier having the same number of characters;
   generating a set of binary operation identifiers and transmitter or receiver identifiers, respectively, each type of binary identifier having a same number of bits, by converting each alphanumeric identifier of said set into a binary identifier using a compression function, wherein the compression function is the same for each type of identifier; and
   forming binary instructions having as transmitter, receiver, or operation identifiers, respectively, a binary identifier from said set.

2. Method according to claim 1, wherein the number of bits is the same for each type of identifier.

3. Method according to claim 1, wherein each alphanumeric character has an integer numeric value unambiguously assigned to it, and the compression function has the form $$F(A)=(\ldots((s[a_0]*c+s[a_1])*c+s[a_2])*\ldots)*+s[a_{n-1}],$$

n being the number of alphanumeric characters in the alphanumeric identifiers, $s[a_i]$, i=0, 1, ..., n−1 being a numerical value assigned to the i-th alphanumeric character $a_i$ of identifier A,
c being an integer larger than the largest one of said integer numeric values.

4. Method according to claim 3, wherein the set of alphanumeric characters comprises between 36 and 63 different characters.

5. Method according claim 1, wherein the number of bits in each binary identifier and the number of bits simultaneously processed by an instruction in a processor of any of the devices of the network are identical.

6. Method for operating a network comprising the steps of transmitting a binary instruction between devices of said network using a protocol obtainable by a method according to claim 1; and
   receiving said binary instruction and transforming an identifier of the received binary instruction into alphanumeric form using a decompression function inverse to said compression function.

7. A computer-implemented method of operating a network based on a communication protocol for transmitting binary instructions between devices in a network, each instruction comprising at least one of a binary transmitter identifier, a binary receiver identifier and a binary operation identifier, wherein each binary identifier is related to an alphanumeric identifier A=$(a_0, a_1, \ldots, a_{n-1})$ comprising n characters $a_0, a_1, \ldots, a_{n-1}$ descriptive of the transmitter, the receiver or the operation, the method comprising:
   receiving at least one of a binary transmitter identifier, a binary receiver identifier, and a binary operation identifier;
   compressing the at least one of the binary transmitter identifier, a binary receiver identifier and a binary operation identifier by a compression function $$F(A)=(\ldots((s[a_0]*c+s[a_1])*c+s[a_2])*\ldots)+s[a_{n-1}],$$

$s[a_i]$, i=0, 1, ..., n−1 being a numerical value assigned to the i-th alphanumeric character $a_i$ of identifier A,
c being an integer larger than the largest one of said integer numeric values; and
transmitting the compressed at least one of a binary transmitter identifier, a binary receiver identifier, and a binary operation identifier.

8. Method according to claim 7, further comprising:
   compressing the binary operation identifier by said compression function; and
   compressing at least one of the binary receiver identifier and the binary transmitter identifier by said compression function.

9. Method according to claim 7, wherein the number of bits is the same for each type of identifier.

10. Method according to claim 7, wherein the set of alphanumeric characters comprises between 36 and 63 different characters.

11. Method according to claim 7, wherein the number of bits in each binary identifier and a number of bits simultaneously processed by an instruction in a processor of any of the devices of the network are identical.

12. Method according to claim 7, further comprising
transmitting a binary instruction between devices of said network using the communication protocol; and
receiving said binary instruction and transforming an identifier of the received binary instruction into alphanumeric form using a decompression function inverse to said compression function.

13. Method for developing a communication protocol for transmitting binary instructions between devices in a network, each instruction comprising at least one of a binary transmitter identifier, a binary receiver identifier and a binary operation identifier, the method comprising:
determining a set of alphanumeric identifiers for each transmitter or receiver of the network, or for each operation, respectively, each alphanumeric identifier having the same number of characters,
generating a set of binary transmitter, receiver, or operation identifiers, respectively, having a same number of bits by converting each alphanumeric identifier of said set into a binary identifier using a compression function; and
forming binary instructions having as transmitter, receiver, or operation identifiers, respectively, a binary identifier from said set
wherein each alphanumeric character has an integer numeric value unambiguously assigned to it, and the compression function has the form $F(A) = (\ldots((s[a_0]*c+s[a_1])*c+s[a_2])*\ldots)+s[a_{n-1}]$, n being the number of alphanumeric characters in the alphanumeric identifiers,
$s[a_i]$, $i=0, 1, \ldots, n-1$ being a numerical value assigned to the i-th alphanumeric character $a_i$ of identifier A,
c being an integer larger than the largest one of said integer numeric values.

14. Method according to claim 13, further comprising:
compressing the binary operation identifier by said compression function; and
compressing at least one of the binary receiver identifier and the binary transmitter identifier by said compression function.

15. Method according to claim 13, wherein the number of bits is the same for each type of identifier.

16. Method according to claim 13, wherein the set of alphanumeric characters comprises between 36 and 63 different characters.

17. Method according claim 13, wherein the number of bits in each binary identifier and a number of bits simultaneously processed by an instruction in a processor of any of the devices of the network are identical.

18. Method according to claim 13, further comprising
transmitting a binary instruction between devices of said network using the communication protocol; and
receiving said binary instruction and transforming an identifier of the received binary instruction into alphanumeric form using a decompression function inverse to said compression function.

* * * * *